United States Patent [19]

Bidenko et al.

[11] Patent Number: 5,002,659
[45] Date of Patent: Mar. 26, 1991

[54] ARRANGEMENT FOR CLEANING OF WASTE WATER

[75] Inventors: Ivan Bidenko; Vlastimil Koutecky, both of Prague, Czechoslovakia

[73] Assignee: Agrochemicky Podnik, Czechoslovakia

[21] Appl. No.: 342,865

[22] Filed: Apr. 25, 1989

[30] Foreign Application Priority Data

Apr. 25, 1988 [CS] Czechoslovakia ............... 2797-88

[51] Int. Cl.$^5$ .............................................. C02F 3/08
[52] U.S. Cl. ...................................... 210/150; 261/92
[58] Field of Search ...................... 210/619, 150, 151; 261/92, 93

[56] References Cited

U.S. PATENT DOCUMENTS

| 4,351,721 | 9/1982 | Frandsen | 210/150 |
| 4,676,892 | 6/1987 | Grabowski | 210/150 |
| 4,769,138 | 9/1988 | Frandsen | 210/150 |

Primary Examiner—Tom Wyse

[57] ABSTRACT

Arrangement for cleaning of waste water by application of rotating biocontactors utilizing tubular biocontactors open at both ends wound on a rotating cylindrical frame adapted to be alternatively submerged below and raised above the level of the waste water, combining thereby the effect of cleaning by biocontact and of efficient aeration of the waste water.

16 Claims, 2 Drawing Sheets

ARRANGEMENT FOR CLEANING OF WASTE WATER

BACKGROUND OF THE INVENTION

The invention relates to an arrangement for cleaning of waste water utilizing rotating biocontactors.

Actually known arrangements for cleaning of waste water based on the principle of rotating biodisks utilize alternative submerging of disks with adhering functional bioculture into waste water, and its subsequent emerging, securing thus its contact with air. A drawback of the known cleaning arrangements is the low amount of oxygen introduced into the waste water which is not supposed to be used for aeration, and the oxygenation of water has been solely accomplished by submerging a biocontactor into the waste water prior to exposing the biocontactor to air. A consequence thereof is a rather insufficient cleaning by the suspended culture, as the introduced amount of oxygen does not correspond to optimum cleaning conditions. Known water cleaning stations of this kind do not apply the recirculation of the mixture of water and sludge within the space of the biological tank, the consequence of which is unfavourable hydraulic conditions. It is also known that biodisk cleaning stations cannot secure cleaning of water by flocules torn-off from the disk surface, although that is the most active action of the grown film. An increase of the contact surface, that is, and increase in the diameter and of the number disks, leads to an increase in the size of the cleaning station and an increase in its actual and operational costs.

SUMMARY OF THE INVENTION

It is an object of this invention to eliminate to a substantial extend the above-mentioned drawbacks and to provide a water cleaning station which would operate more efficiently than the actually known stations of this kind. According to this invention, face plates are fixed near both ends of a rotatable shaft situated in a tank, which plates are connected near their circumference by longitudinal supporting bars, wherein the bars support individual biocontactors, represented by tubes wound on said supporting bars in such a manner that both open ends of tubes point in direction of rotation of the shaft.

BRIEF DESCRIPTION OF THE DRAWINGS

Examplary emobodiments of the arrangement for waste water cleaning according to this invention are shown diagrammatically in attached drawings where.

DESCRIPTION OF THE PREFERRED EMBODIMENTS

Figure 1:
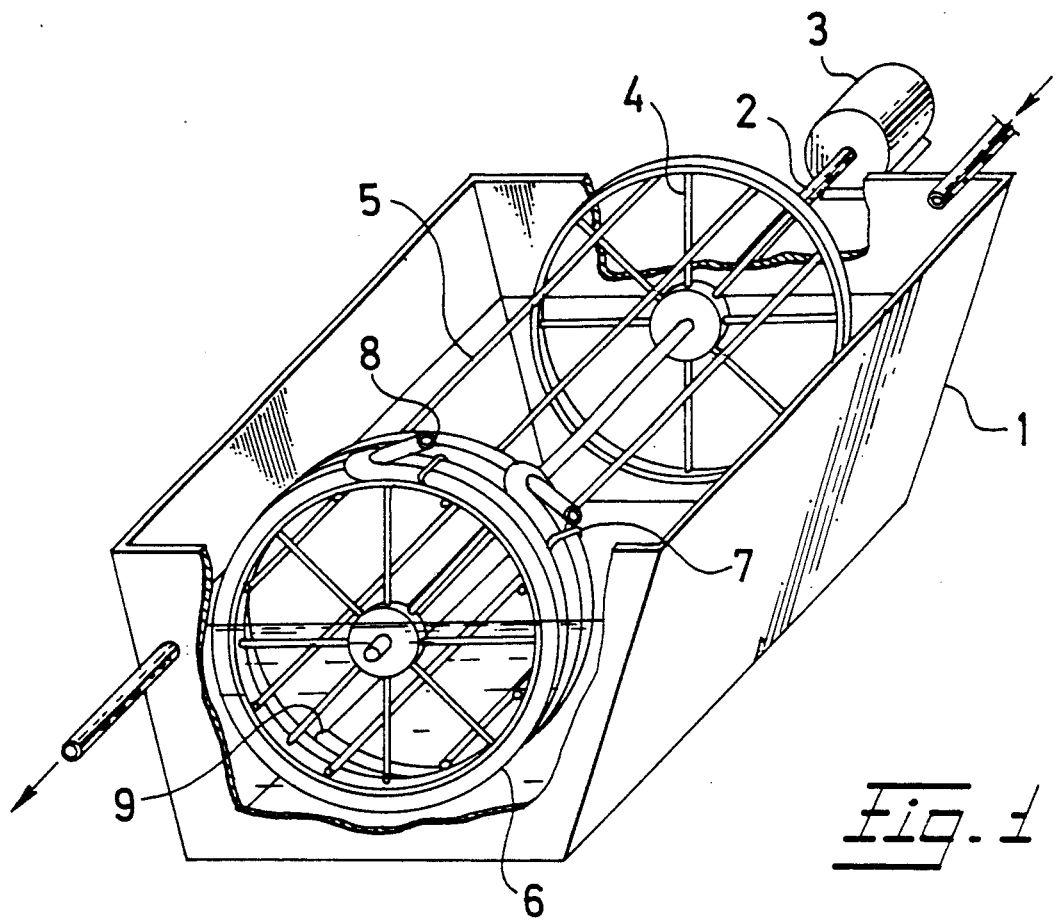
FIG. 1 is an overall axonometric view of a cleaning apparatus in accordance with the invention.

With reference to FIG. 1 the cleaning apparatus of the invention comprises a biological tank 1, in which a rotating shaft 2 is supported, provided, for instance, with an electric driving motor 3 with a gear system for rotating the shaft 2. Near both ends of the rotating shaft 2, face plates 4 are fixed thereon, which mutually interconnected by longitudinal supporting bars 5, around which individual tubular biocontactors 6 are wound. The tubular biocontactors 6 are wound in such a way, that their inlet openings 8 point in direction of rotation of the shaft 2. The tubes forming the biocontactor 9 are wound around the supporting bars 5 to form a turn a loop at the place near the inlet opening 8 of the biocontactor 6, which is at this place fixed to a bar 5 by a clamp 7. The whereafter the tube proceeds in the opposite direction on the supporting bars 5 to form at least a part of a turn and terminates at its opposite end 9, which again points in the direction of rotation of the shaft 2. The biocontactor 6 is fixed to a bar 5 by a clamp 7 near its opposite end 9. Both ends 8 and 9 of the tubular biocontactor 6 remain open.

The arrangement operates so that the rotating shaft 2 also rotates the face plates 4 and the longitudinal bars 5, around which a number of tubular biocontactors 6 are wound. By slow rotation of the biocontactors 6 in the biological tank 1, wherein, the biological tank 1 which is partly filled with waste water so that parts of biocontactors 6 are above the level of the waste water, the inlet opening 8 of each tubular biocontactor 6 becomes alternatively flooded, and in the course of continuating rotation, the internal space of the tubular biocontactor 6 is filled with waste water. At the moment the inlet opening 8 rises above the waste water level, the liquid proceeds to the lower part of the biocontactor 6 and its internal space starts to be filled by air (or by some gas in case the operation takes place in another medium) until the inlet opening 8 of the biocontactor 6 again comes in contact with the liquid level. In the course of the following rotation, air is enclosed in a part of the tubular biocontactor 6 between two liquid columns, and the originally entered liquid is forced to flow around the loop, around the inlet opening 8 and in direction of rotation of the rotating shaft 2, leaving the biocontactor 6 from the outlet opening 9. Air enclosed in the internal space of the biocontactor 6 is also forced into the liquid, causing an internsive aeration of the liquid in the tank 1. Individual biocontactors 6 are mutually shifted so that their inlet openings 8 and outlet openings 9 are staggered so that the electric motor is uniformly stressed, and particularly so that air is uniformly introduced into the liquid within the tank 1 and that an intensive and uniform aeration is accomplished. In the course of this operation, an increased pressure is generated within the tubular biocontactors 6 causing an increased transfer of oxygen into the biological film, thus increasing the efficiency of biological water cleaning. The arrangement enables recirculation of waste water and of the suspension from different places in the biological tank 1 to othe places thereof, the different places being determined by distances of inlet openings 8 from outlet openings 9 of biocontactors 6 wound on longitudinal bars 5. Hydrodynamic conditions in the tank 1 and the cleaning effect of the arrangement are thus substantially improved.

Figure 2:
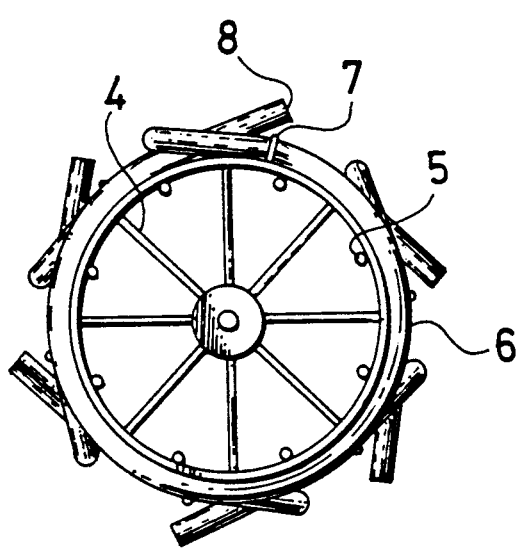
FIG. 2 shows a side view of rotatable part of the arrangement indicating how staggered inlets and outlets of the biocontactors are arranged.

FIG. 2 shows a side view on the rotating part of the arrangement with a number of tubular biocontactors 6 wound around the longitudinal bars 5 connecting the face plates 4. The inlets 8 and outlets 9 of individual tubes of biocontactors 6 are uniformly distributed along the circumference of the face plates 4 in order to provide a uniform and effective aeration of the content of the tank 1 and a uniform stress on the driving motor.

Figure 3:
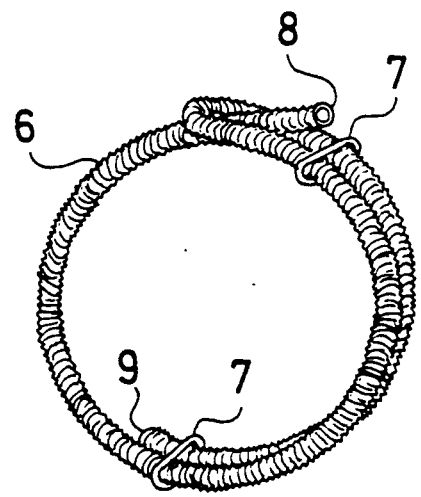
FIG. 3 is an axonometric view of a tubular biocontactor made of plastics and FIG. 4 is another embodiment of a tubular biocontactor in accordance with the invention.

FIG. 3 is an axonometric view of a tubular biocontactor 6 made of plastics of similar shape to that shown in FIG. 1.

Figure 4:
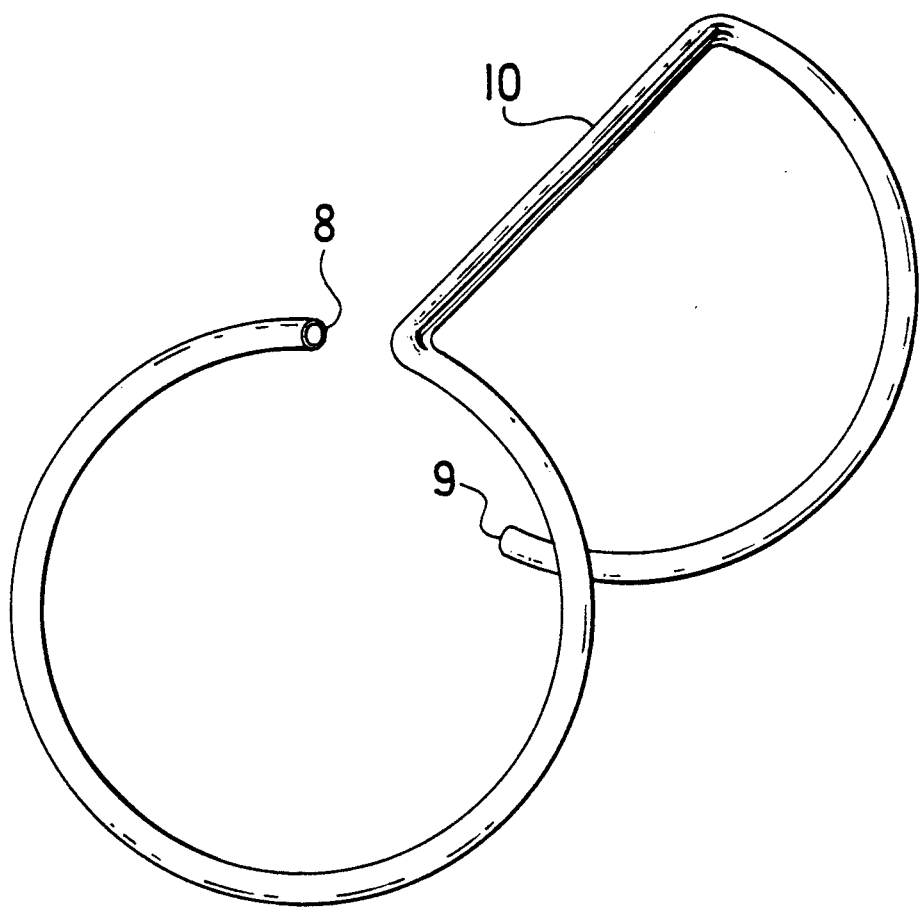

FIG. 4 is an axonometric view of an alternative embodiment of a tubular biocontactor 6 where parts of the turns of the biocontactor 6 are connected by a tubular part which is substantially parallel to the axis of the shaft 2.

The arrangement according to this invention offers a number of advantages as compared to the known biocontactors in the shape of biodisks, the major advantage consisting in that no costly and inefficient biological disks need be used, whereby a substantially higher efficiency of cleaning is obtained. Another advantage is the high amount of oxygen introduced into the waste water with low energetic requirements. The high oxygenating capacity contributes to the improved efficiency of cleaning by means of torn-off biological film and flocules in suspension, and also by the simultaneous increased introduction of oxygen into the biological film in the internal space of the biocontactors due to the overpressure within the tubes. Due to rotation of the shaft, an improved mixing of the content of the biological tank is achieved. Another advantage is the possibility of recirculation of the mixture of water and sludge in any part of the biological tank. Due to removal of biodisks, the arrangement enables a substantial reduction of the size of the cleaning arrangement, a reduction of the weight of rotating parts and thus a reduction in weight of the whole cleaning arrangement, which results in a simultaneous reduction of energetic requirements. Due to a substantial increase of the efficiency of the cleaning arrangement, the actual costs and costs of operating of the cleaning are reduced.

The arrangement for cleaning of waste water according to this invention is suitable for application particularly for smaller or one family houses, recreation buildings, industrial and agricultural establishments with primarily sewage pollution.

We claim:

1. An apparatus for cleaning waste water comprising:
a tank for holding waste water;
a rotatable shaft supported within said tank;
a face plate mounted near each end of said shaft;
a plurality of longitudinal bars spaced from each other and having their terminal portions secured adjacent to the periphery of said face plates; and
at least one continuous tubular biocontactor wound at least partially around said longitudinal bars, said tubular biocontactor having an open inlet end and an open outlet end with both ends of the tubular biocontactor facing in the direction of rotation of said shaft.

2. An appparatus for cleaning waste water as defined in claim 1, further including means for rotating said shaft.

3. An apparatus for cleaning waster water as defined in claim 2, wherein said means for rotating said shaft includes an electric motor.

4. An apparatus for cleaning waste water as defined in claim 2, wherein a plurality of continuous tubular biocontactors are spaced about said spaced longitudinal bars so as to provide a uniform stress on the means for rotating the shaft.

5. An apparatus for cleaning waste water as defined in claim 1, wherein a portion of said continuous tubular biocontactor is folded upon itself around said inlet end of said tubular biocontactor, such that said outlet end of said tubular biocontactor faces in the direction of rotation of said shaft.

6. An apparatus for cleaning waste water as defined in claim 1, wherein at least a part of said tubular biocontractor extends in an axial direction with respect to the shaft.

7. An apparatus for cleaning waster water as defined in claim 6, wherein said part of said tubular biocontactor extending in an axial direction with respect to the shaft is the central portion of said tubular biocontactor.

8. An apparatus for cleaning waste water as defined in claim 6, wherein said part of said tubular biocontactor extending in an axial direction with respect to the shaft extends to substantially the opposite face plate.

9. An apparatus for cleaning waste water as defined in claim 6, wherein the inlet end of said tubular biocontactor is located adjacent one of said face plates and the outlet end of said tubular biocontactor is located adjacent the other of said face plates.

10. An apparatus for cleaning waste water as defined in claim 1, wherein said apparatus has a plurality of said continuous tubular biocontactors wound about said spaced longitudinal bars.

11. An apparatus for cleaning waste water as defined in claim 10, wherein the inlet ends of said tubular biocontactors are spaced from each other with respect to the circumference of said face plate.

12. An apparatus for cleaning waste water in an enclosure or a confined space comprising:
a rotatable shaft; a face plate mounted near each end of said shaft; a plurality of longitudinal bars spaced from each other and having their terminal portions adjacent to the periphery of said face plates; and at least one continuous tubular biocontactor wound at least partially around said longitudinal bars, said tubular biocontactors having an open inlet end and an open outlet end with both ends of the tubular biocontactor facing the direction of rotation of the shaft.

13. An apparatus for cleaning waste water as defined in claim 12, wherein a portion of said continuous tubular biocontactor is folded upon itself around said inlet end of said tubular biocontactor, such that said outlet end of said tubular biocontactor faces the direction of rotation of said shaft.

14. An apparatus for cleaning waste water as defined in claim 12, wherein at least a part of said tubular biocontactor extends in an axial direction with respect to the shaft.

15. An apparatus for cleaning waste water as defined in claim 14, wherein said part of said tubular biocontactor extending in an axial direction with respect to the shaft extends to substantially the opposite face plate.

16. An apparatus for cleaning waste water as defined in claim 14, wherein the inlet end of said tubular biocontactor is located adjacent one of said face plates and the outlet end of said tubular biocontactor is located adjacent to the other of said face plates.

* * * * *